H. A. TUTTLE.
REVERSING GEARING.
APPLICATION FILED DEC. 13, 1919.

1,392,986.

Patented Oct. 11, 1921.
2 SHEETS—SHEET 1.

Inventor,
Henry A. Tuttle
by
T. T. ——
atty

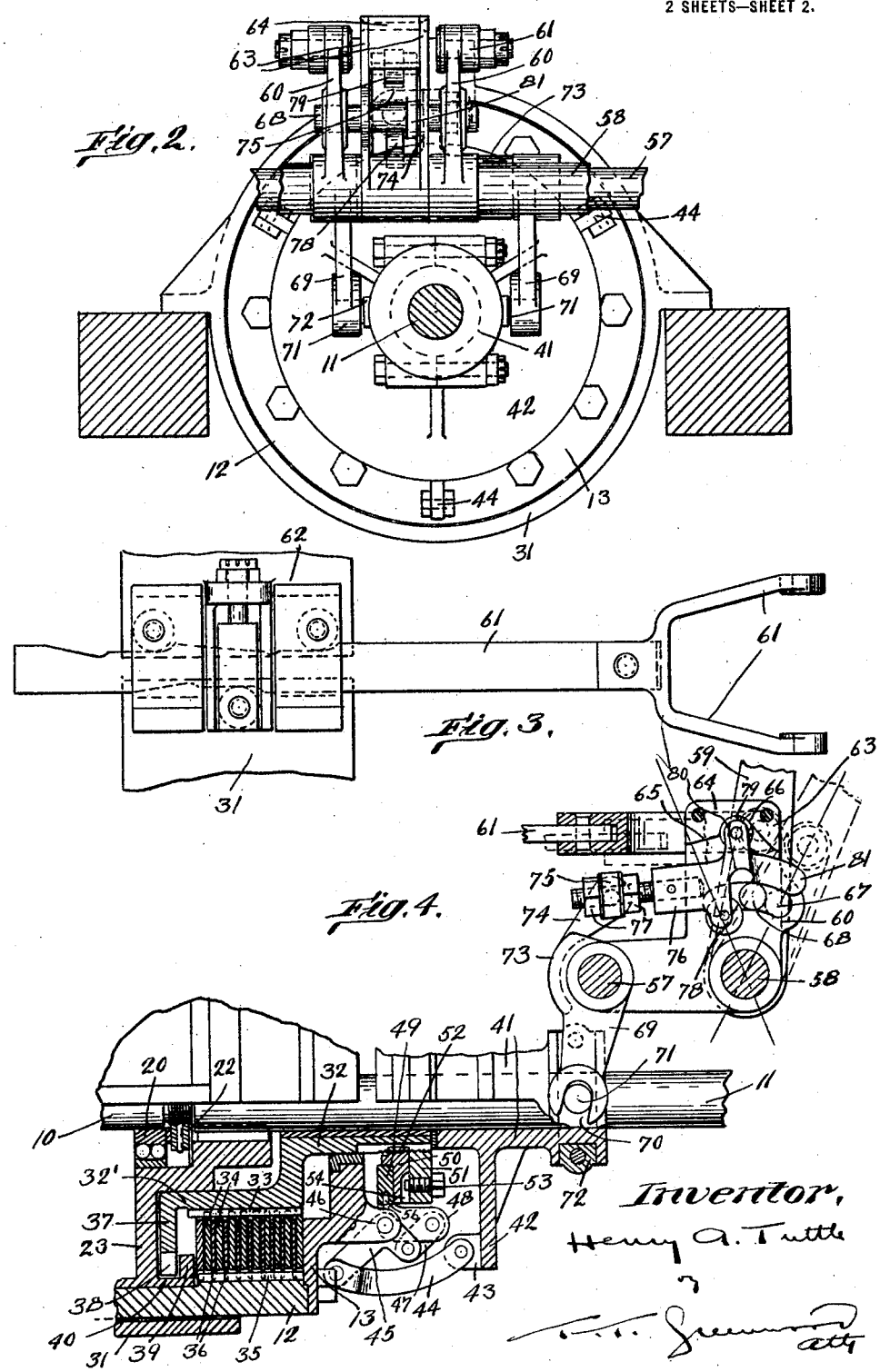

UNITED STATES PATENT OFFICE.

HENRY A. TUTTLE, OF UPTON, MASSACHUSETTS.

REVERSING-GEARING.

1,392,986.

Specification of Letters Patent.

Patented Oct. 11, 1921.

Application filed December 13, 1919. Serial No. 344,532.

*To all whom it may concern:*

Be it known that I, HENRY A. TUTTLE, a citizen of the United States, residing at Upton, in the county of Worcester and State of Massachusetts, have invented an Improvement in Reversing-Gearing, of which the following is a specification.

My invention relates to reverse gearing of the type in which two shafts, such as an engine shaft and a propeller shaft may, through such gearing, be directly or reversely rotated, or one, as the propeller shaft, may remain without rotation while the other of said shafts is rotating; the particular type of reverse gearing including pinions mounted on a pinion carrier or case and engaging gears on the driving and driven shafts, the rotation of said case being controlled by a brake to secure reverse drive and by a clutch, associated with the driven shaft, to secure forward drive.

The object of my invention is to provide improved means for causing the engagement and disengagement of the clutch mechanism; to provide means, other than the linkages connecting the thrust sleeve and clutch plate, for driving said thrust sleeve; to provide improved means for operating the clutch and brake mechanism by an actuating member whereby each mechanism is independently movable from neutral into its operated position.

Certain features of this invention are shown but not claimed in my applications Serial No. 175,268, filed June 18, 1917; Serial No. 176,673, filed June 25, 1917; Serial No. 274,247, filed January 31, 1919; Serial No. 339,108, filed November 19, 1919.

Fig. 2 is a front elevation of the same.

Fig. 3 is a partial plan view of the brake operating mechanism.

Fig. 4 is a sectional partial view of the reverse gearing operating mechanism.

Figure 1:
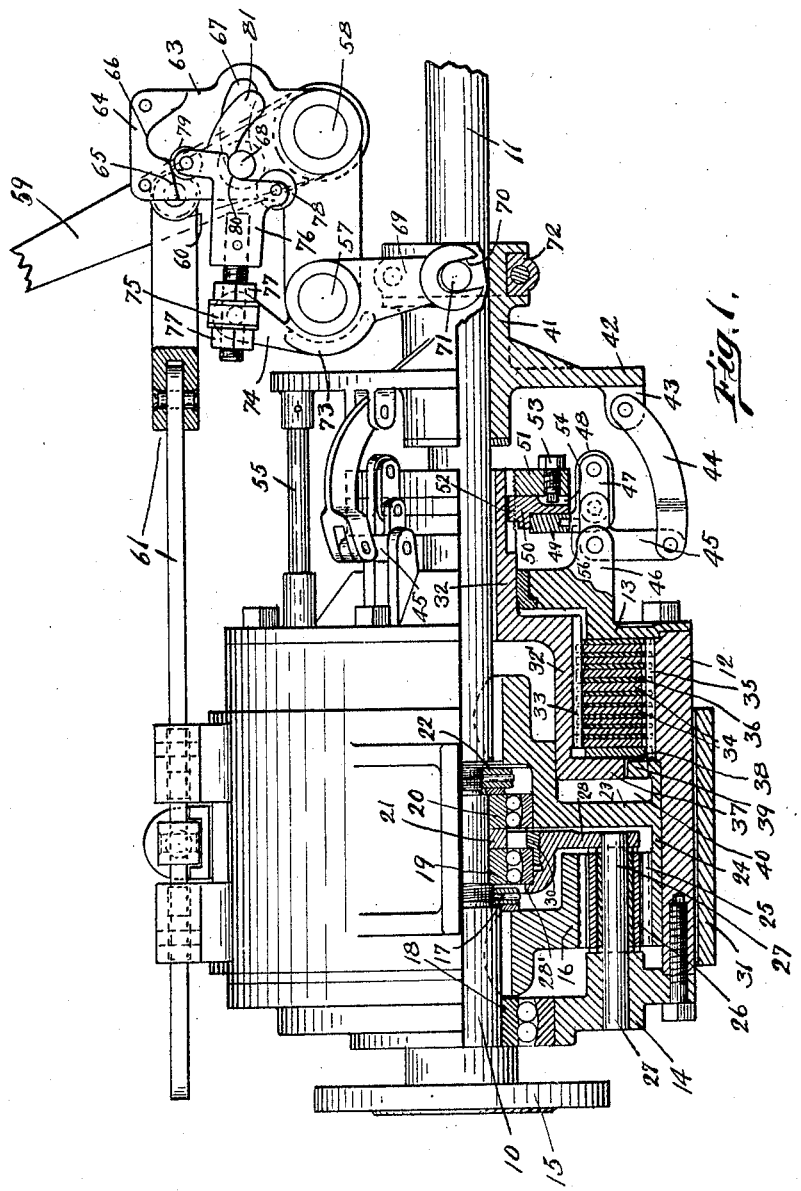
Figure 1 is a view in side elevation, partly in section, illustrating the reverse gearing embodying my invention.

As here shown, the reversing gearing includes a driving shaft 10, a driven shaft 11 and a casing comprising a cylindrical or barrel portion 12 and end plates or walls 13 and 14. Driving shaft 10 terminates, without the casing, in a flange 15 by means of which it may be coupled with an engine shaft and by which it may be rotated. A spur gear 16 is secured to the shaft within the casing against rotation on said shaft by means of a key, and against motion along said shaft by means of a nut 17 threaded onto the shaft. The nut 17 also serves to maintain the inner race of a ball bearing 18 in position on said shaft by causing said race to be tightly engaged between a shoulder of said shaft and the spur gear 16. The outer race of said bearing is secured in the end wall 13 of the casing.

The end of the shaft within the casing is provided with two ball bearings 19 and 20, the inner races of which are maintained in spaced relation on the shaft by the interposed spacing ring 21, and which are secured on said shaft between the nuts 17 and 22 threaded on said shaft. The outer race of bearing 20 is disposed in an annular recess in the wall of the internal gear 23 which is keyed to the driven shaft 11 and said bearing 20 forms a support for said driven shaft 11.

The internal gear 23 includes a cylindrical portion 24 adapted to rotate within the cylindrical portion 12 of the casing and said portion 24 has internally formed gear teeth 25. Pinions 26 engage the teeth of the internal gear 23 and the spur gear 16, whereby the rotation of the driving shaft 10 may cause the rotation of the driven shaft 11 under predetermined conditions. The pinions 26 are adapted to rotate on pins 27 secured in the end wall 14 of the casing and the free ends of said pins are maintained against bending or deflection by the plate 28 in which the ends of the pins are disposed.

Plate 28 has a concentrically arranged opening therein and the outer race of the ball bearing 19 is disposed and secured in said opening between the flange 28' and the threaded nut 30. Plate 28, the end wall 14, and the pins 27 comprise a compact structure adapted to form a rigid support or carrier for the pinions 26.

The clutch mechanism, by means of which the casing bearing the pinion gears 26 may be secured to the driven shaft 11 against rotation thereby to lock the driving and driven shafts for direct drive, includes a clutch plate carrier having a hub 32 arranged on the driven shaft 11 beyond the internal gear and free on said shaft. Beyond the hub portion, the plate carrier is formed with an enlarged annular portion 32 of sufficient diameter to receive the hub of the annular gear 23, and a series of teeth 33 are formed on the periphery of said annular portion 32' and are adapted to engage corresponding teeth on the clutch plates 34. The cylindrical portion 12 of the casing adjacent the end wall 13 is provided with a series of teeth 35 adapted to engage corresponding teeth on clutch plates 36. The toothed connection between the clutch plates and the plate carrier and casing form means by which the plates may be longitudinally moved to cause their engagement or disengagement but which prevent rotation of the plates independent of their respective carriers.

The end of the annular portion 32′ of the plate carrier is formed with a radially extended flange 37 provided with a plurality of teeth 38 and the cylindrical portion 24 of the internal gear is formed with an inwardly extended flange 39 having teeth adapted to be engaged by the teeth 38 in the plate carrier when the clutch is in the engaged condition and to be disengaged therefrom when the clutch is in the disengaged or neutral condition. In order that the plate carrier may be moved to its disengaged position from the flange 39, a space 40 is provided between said flange and the wall of the internal gear of a width somewhat greater than the thickness of the flange 37 of the plate carrier adapted to receive the plate carrier in the disengaged condition of the clutch.

In the position of the plate carrier in which the flange 37 is disengaged from the flange 39 of the internal gear, the clutch plates are also disengaged and the rotation of the plate 36 associated with the internal gear, in the neutral or reverse drive condition of the gearing may cause the plates 37 and the plate carrier to be rotated, due to the drag between the plates caused by the viscosity of the lubricant employed, without affecting the rotation of the driven shaft 11 or causing an appreciable absorption of power thereby.

A thrust sleeve 41 is slidably and rotatably mounted on the driven shaft and forms part of the clutch actuating mechanism. Said sleeve is formed with an outwardly extending flange 42 provided with lugs 43 to which the links 44 are pivoted. Said links 44 are operably connected to one arm of the bell crank levers 45 pivoted to outwardly extending lugs 46 of the end wall 13 of the gear casing, the other arms of the bell crank levers 45 are pivoted to the links 47 which are in turn pivoted to the axially extended ears 48 of the ring 49, which ring is adapted to fit a recessed portion in the thrust ring 50. The bell cranks 45 and links 47 form toggles whereby a relatively great pressure may be exerted on the clutch plates by a comparatively slight pressure of the thrust sleeve.

The hub 32 of the clutch plate carrier extends through a bushing or bearing in the end wall 13 of the gear case and is provided with an exteriorly threaded portion to receive the adjusting collar 51. Said hub is formed with a key way adapted to receive the extension 52 on the thrust ring 50 whereby said ring is constrained to rotate with said hub yet is free to slide thereon. Said collar 51 and thrust ring 50 are adapted to be secured in fixed relation or permitted independent movement at will, the connection securing said collar and ring in fixed relation including a pin 53 threaded through said collar and engaging the walls of any one of a series of slots or openings 54 in the ring.

The flange 42 of the thrust sleeve has secured in bosses therein the rods or pins 55 arranged parallel with the driven shaft. Said rods are adapted for longitudinal sliding engagement with the end wall 13 of the gear casing whereby the rotation of said casing is communicated to the thrust sleeve thereby relieving the clutch links from any driving torque.

In the position shown in Fig. 1 the clutch plates are in the engaged condition with the gearing arranged for forward drive and the toggles formed by the bell crank levers 45 and links 44 are fully extended, being restrained from movement to an overshot position by the stop pin 56 arranged in the ring 49. As the thrust sleeve is moved to the left from the position shown in Fig. 1, the toggles formed by the links and levers are broken and the clutch plates are thereby permitted to separate. The continued movement of the thrust sleeve further opens the toggles and engages with the hub of the plate carrier, forcibly moving said carrier along the shaft and disengaging it from the internal gear, thereby effecting the complete disengagement of the clutch from any moving member of the reverse gearing. A movement of the thrust sleeve in the reverse direction operates through the links 44 to straighten the toggles, which operates through the thrust ring 50 to move the plate carrier into engagement with the internal gear and thereafter with the plates carried by the gear casing to set the gearing for direct drive.

In the operation of reverse gearing of the type described it is important that, as the operating lever is moved from the position for direct drive to neutral, such movement will move the clutch from engaged to neutral position, but will be inoperative to set the gearing in condition for reverse drive, while a continued movement of the operating handle will cause the gearing to be set in condition for reverse drive without further affecting the clutch mechanism.

The mechanism by which this result is obtained includes what may be termed a forward shaft 57 and a rear shaft 58, each of said shafts being supported by suitable bearings, not necessarily illustrated. On the rear shaft, at any appropriate point, is fixed the operating handle or lever 59, while at a point approximately above the thrust sleeve, the rear shaft has secured thereon arms 60 connected at their upper ends by a cam rod 61 to govern the braking mechanism 62 which mechanism comprises means whereby the rod 61 may operate to contract the brake band 31 to secure the casing against rotation, or permit the brake band to be released to release said casing for rotation.

A locking guide 63 is supported upon the shafts 57 and 58 being preferably in the form of spaced sections approximately of right angular form, the horizontal portion affording bearing for the respective shafts, the vertical portion extending above the rear shaft with the upper ends of the plates forming the vertical portions of the guides connected by a spacing block 64 having its lower surface formed with a cam face. The cam face presents, from the forward edge, an upwardly and rearwardly inclined part 65 abruptly terminating in a circularly curved portion 66 from which the cam face is downwardly extended to the edge of said guide 63. The vertical portion of said spaced plates are further formed with an arcuate slot 67 and a guide shaft or pin 68 is arranged to move in said slot. The terminals of said guide shaft beyond the guides are mounted in the arms 60.

The forward shaft 57 is provided with depending arms 69 having terminal recesses 70 loosely engaging pin 71 disposed in diametrically opposed relation on a collar 72 mounted for free rotative movement in a channel or way formed at one terminal of the thrust sleeve 41, which construction provides for moving the sleeve longitudinally of the driven shaft independently of the rotative action of said sleeve.

Above the shaft 57, the arms 69 are connected by a bridge 73 formed with an upwardly extended lug 74. Said lug is formed with a transversal opening therein to pivotally receive a crossmember 75 and said cross member is formed with a transverse opening in which the threaded extension of a trip block 76 is adjustably secured by nuts 77.

Said trip block 76 is positioned between the side plates of the guide and is provided with a depending lug in which is pivoted a roller 78 which is adapted to be engaged by the pin or guide shaft 68 during its movement from neutral to direct drive position. On the block, above the roller 78, is an upwardly extended lug to which is pivoted the roller 79 adapted to engage the cam face of the guide block 64. The end portion of said trip block is provided with two vertical faces separated by the circular grooved portion 80 into which the pin 68 is adapted to fit in certain positions of the arm 60; and the sides of said block are provided with longitudinally extended arcuate fingers 81 which, in a certain position of the block 76 are adapted to have their lower arcuate faces coincident with the upper face of the slot 67 in the guide plates 63. Said fingers are adapted to be maintained in such position against downward movement by pin 68, as shown in Fig. 4. The fingers 81 are formed with circularly shaped recesses therein conforming to, and continuing, the circular arc 80 formed in the end portion of trip block 76, and said groove or recess 80 is adapted to receive said pin whereby its movement to the right actuates the trip block to operate the clutch mechanism.

In the position shown in Fig. 1, in which the clutch is in the engaged condition, the trip block 76 is maintained against upward movement by the engagement of the roller 79 carried thereby with the sloping cam face 65 of the guide block 64, and thereby held in engagement with the pin 68 against movement independent of said pin, and thereby the clutch is maintained in engaged position for forward drive.

As the operating handle or lever is moved from forward drive position to neutral position, the shaft 58 is angularly moved and carries with it the pin or guide shaft 68. Trip block 76 is maintained with the walls of the recess 80 in engagement with the pin 68 by the engagement of the roller 79 carried by said block with the cam surface 65 of the guide block 64, and consequently the movement of the pin 68 causes movement of the trip block and associated mechanism to move the clutch into disengaged position. With the continued movement of the pin 68 and the trip block, the roller 79 is eventually moved beyond the cam face 65 to a position under the circular recess 66. As the trip block is now unrestrained toward movement in an upward direction, the further movement of the pin 68 causes said pin to so act against the face of the recess 80 in the arcuate fingers 81 as to move said fingers upward, disposing the roller 79 in the recess 66 of the guide block and releasing said trip block from engagement with said pin whereby said pin is free to pass below the lower arcuate face of the fingers 81 on which said fingers rest upon a further movement of said pin.

In the position of the trip block with the roller 79 carried thereby disposed in the recess 66, the clutch is in the neutral or disengaged condition, and the trip block is prevented from further movement in that direction, inasmuch as the roller 79 is maintained in the recess 66 in the guide block 64 by the engagement of the arcuate arms 81 with the pin 68.

The reverse operating mechanism is so arranged that, during the movement of the operating handle and clutch mechanism from direct drive to neutral position, the reverse operating mechanism will not be actuated to secure the casing against rotation. A continued movement of the operating handle in the same direction, or from neutral to reverse drive position, will cause the pin 68 to travel in the guide slot 67 under the lower arcuate face of the fingers 81 and thereby maintain the trip block 76 in its neutral position during the movement of the arm 60 to reverse drive position.

In the movement of the operating handle from the reverse to forward drive position, the movement of the arms 60 brings the pin 68 carried thereby into engagement with the top portion of the lower roller 78 of the trip block 76 and thereby forces the upper roller 79 carried thereby from engagement with the recessed face of the guide block 64 and permits the engagement of the recessed portion 80 of the trip block 76 with the pin 68, whereupon the continued movement of said pin actuates the trip block and associated mechanism to set the clutch for forward drive.

I claim:

1. In a reversing gearing, a driving shaft, a driven shaft, gearing connecting said shafts, clutch mechanism to secure forward drive including a casing, an axially movable member, a clutch operating member freely mounted on one of said shafts, linkages connecting said operating member with said axially movable member, said clutch member and casing having coöperating components by which they are constrained for conjoint rotation admitting of their relative axial movement.

2. In a reversing gearing, a driving shaft, a driven shaft, gearing connecting said shafts, clutch mechanism to secure forward drive including a clutch plate carrier mounted on one of said shafts, a set of clutch plates carried thereby, a casing, a set of clutch plates carried thereby, a clutch operating member freely mounted on one of said shafts, linkages connecting said plate carrier and said operating member, said operating member having a component in sliding engagement with said casing which admits of its being driven by said casing.

3. In a reversing gearing, a driving shaft, a driven shaft, gearing connecting said shafts, clutch mechanism to secure forward drive including a clutch plate carrier mounted on one of said shafts, a set of clutch plates carried thereby, a casing, a set of clutch plates carried thereby, a clutch operating member freely mounted on one of said shafts, linkages connecting said plate carrier and said operating member which admits of its axial movement with respect to said casing but prevents independent rotary movement with respect thereto.

4. In a reversing gearing, a driving shaft, a driven shaft, gearing connecting said shafts, clutch mechanism to secure forward drive including a clutch plate carrier mounted on one of said shafts, a set of clutch plates carried thereby, a casing, a set of clutch plates carried thereby, a clutch operating member freely mounted on one of said shafts, linkages connecting said plate carrier and said operating member, said casing having apertures in its end wall, and said operating member having projections slidably received in the apertures in said casing.

5. In a reversing gearing, a driving shaft, a driven shaft, gearing connecting said shafts, a clutch mechanism to secure forward drive including a clutch plate carrier mounted on one of said shafts, a set of clutch plates carried thereby, a casing, a set of clutch plates carried thereby, a clutch operating member freely mounted on one of said shafts, linkages connecting said plate carrier and said operating member, said casing having apertures in its end wall, and rods carried by said operating member slidably received in the apertures in said casing.

6. In a reversing gearing, a driving shaft, a driven shaft, gearing connecting said shafts, clutch mechanism to secure forward drive comprising a clutch plate carrier mounted on one of said shafts, a set of clutch plates carried thereby, a casing, a set of clutch plates carried thereby, clutch operating mechanism including a flanged sleeve freely mounted on one of said shafts, linkages connecting said sleeve with said clutch plate carrier, said casing having an end wall with apertures therein, and axially disposed rods carried by the flange of said sleeve slidably received in the apertures in said casing.

7. In a reversing gearing, a driving shaft, a driven shaft, gearing connecting said shafts, clutch mechanism to secure forward drive, brake mechanism to secure reverse drive, an actuating member for said mechanisms arranged to be moved into releasable clutching engagement with one of said mechanisms to operate it, and means to govern the clutching and unclutching of said actuating member with said mechanism.

8. In a reversing gearing, a driving shaft, a driven shaft, gearing connecting said shafts, clutch mechanism to secure forward drive, brake mechanism to secure reverse drive, an actuating member for said clutch and brake mechanism, and means which admits of the disengagement of said actuating member from one of said mechanisms during its actuation of the other mechanism and the locking of the disengaged mechanism in disengaged position.

9. In a reversing gearing, a driving shaft, a driven shaft, gearing connecting said shafts, clutch mechanism to secure forward drive, brake mechanism to secure reverse drive, an actuating member for said clutch and brake mechanisms arranged to be moved into releasable clutching engagement with said mechanisms to operate them and movable from a neutral position on both sides thereof for the operation of both mechanisms alternately, and means to control the release of said actuating member from said clutch mechanism in the neutral position of said actuating member.

10. In a reversing gearing, a driving shaft, a driven shaft, gearing connecting said shafts, clutch mechanism to secure forward drive, brake mechanism to secure reverse drive, an actuating member for said clutch and brake mechanism, movable from a neutral position on both sides thereof for the actuation of both mechanisms, and means which admits of its disengagement from one of said mechanisms in neutral position, and locking of the disengaged mechanism in neutral position.

11. In a reversing gearing, a driving shaft, a driven shaft, gearing connecting said shafts, clutch mechanism to secure forward drive, brake mechanism to secure reverse drive, an actuating member for said mechanisms, said clutch mechanism arranged for detachable engagement with said actuating member, and means to cause its disengagement from said actuating member.

12. In a reversing gearing, a driving shaft, a driven shaft, gearing connecting said shafts, clutch mechanism to secure forward drive, brake mechanism to secure reverse drive, an actuating member for said mechanisms, a clutch operating member arranged for detachable engagement with said actuating member, and means to cause its disengagement from and engagement with said actuating member.

13. In a reversing gearing, a driving shaft, a driven shaft, gearing connecting said shafts, clutch mechanism to secure forward drive, brake mechanism to secure reverse drive, an actuating member for said mechanisms, a clutch operating member arranged for detachable engagement with said actuating member, and means to cause its disengagement from said actuating member and lock it in disengaged position.

14. In a reversing gearing, a driving shaft, a driven shaft, gearing connecting said shafts, clutch mechanism to secure forward drive, brake mechanism to secure reverse drive, an actuating member for said mechanisms, a clutch operating member arranged for detachable engagement with said actuating member, and means to cause its disengagement from and engagement with said actuating member and lock it in disengaged position.

15. In a reversing gearing, a driving shaft, a driven shaft, gearing connecting said shafts, clutch mechanism to secure forward drive, brake mechanism to secure reverse drive, a clutch operating member having a recess, an actuating member having a projection adapted to be received in the recess in said clutch operating member, and a cam member engaged by said clutch operating member to control its engagement with said actuating member.

16. In a reversing gearing, a driving shaft, a driven shaft, gearing connecting said shafts, clutch mechanism to secure forward drive, brake mechanism to secure reverse drive, a clutch operating member having a recess and an extended finger, an actuating member having a projection adapted to be received in the recess in said clutch operating member, said actuating member adapted to be moved in both directions from a neutral position to operate said mechanisms, a cam member engaged by said clutch operating member arranged to hold said member in engagement with the projection of said actuating member during its movement from neutral in one direction and to release it therefrom and cause its finger to engage the projection thereof during a movement of said actuating member in the opposite direction from neutral whereby said clutch operating member is locked in released position.

17. In a reversing gearing, a driving shaft, a driven shaft, gearing connecting said shafts including a pinion carrier having two spaced-apart end walls having alined apertures therein through which the driving shaft is extended, a bearing member received in one of said apertures, one of the side walls having a threaded recess surrounding its apertures, a bearing member received therein, and a nut threaded in said recess to secure the bearing member therein.

18. In a reversing gearing, a driving shaft, a driven shaft alined therewith, gearing connecting said shafts including an internal gear on the driven-shaft, and a pinion carrier having spaced-apart side walls on the driving shaft, said pinion carrier having alined apertures in its side walls, bearing members received therein, and said driving shaft supported in said bearings, said internal gear having an annular recess therein, a bearing member arranged therein and said driving shaft supported in the bearing member.

In testimony whereof, I have signed my name to this specification, in the presence of a subscribing witness.

HENRY A. TUTTLE.

Witness:
H. B. DAVIS.